United States Patent
Krishnamoorthy et al.

(10) Patent No.: US 9,730,006 B1
(45) Date of Patent: Aug. 8, 2017

(54) ENHANCED SYSTEM ACQUISITION FOR WEARABLES

(71) Applicant: QUALCOMM Incorporated, San Diego, CA (US)

(72) Inventors: Parthasarathy Krishnamoorthy, San Diego, CA (US); Suresh Kumar Bitra, Mangalagiri (IN); Soumen Mitra, Hyderabad (IN); Bhaskara Viswanadham Batchu, Ameenpur Village (IN); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/130,786

(22) Filed: Apr. 15, 2016

(51) Int. Cl.
*H04W 76/02* (2009.01)
*H04W 4/02* (2009.01)
*G01S 7/48* (2006.01)
*H04M 17/00* (2006.01)
*H04W 4/00* (2009.01)
*H04W 24/10* (2009.01)
*H04W 84/04* (2009.01)

(52) U.S. Cl.
CPC ........... *H04W 4/008* (2013.01); *H04W 24/10* (2013.01); *H04W 76/023* (2013.01); *H04W 84/042* (2013.01)

(58) Field of Classification Search
CPC ... H04W 4/008; H04W 76/023; H04W 24/10; H04W 40/20; H04W 4/025; G01S 5/14; G01S 5/30; G01S 7/4808; H04B 7/0834; H04M 17/305; H04M 1/7253
See application file for complete search history.

(56) References Cited

U.S. PATENT DOCUMENTS

| | | | |
|---|---|---|---|
| 7,934,090 B2* | 4/2011 | Maria | G06F 21/41 709/219 |
| 8,869,263 B2 | 10/2014 | Pasquero et al. | |
| 9,538,564 B2* | 1/2017 | Belogolovy | H04W 76/023 |
| 2004/0192260 A1* | 9/2004 | Sugimoto | G06F 11/1456 455/412.1 |
| 2011/0077003 A1* | 3/2011 | Shin | H04W 48/16 455/434 |
| 2013/0106684 A1 | 5/2013 | Weast et al. | |
| 2015/0098349 A1* | 4/2015 | Wei | H04W 16/14 370/252 |
| 2015/0148066 A1 | 5/2015 | Gilberton et al. | |
| 2015/0245186 A1 | 8/2015 | Park et al. | |
| 2015/0304851 A1 | 10/2015 | Chen et al. | |

(Continued)

*Primary Examiner* — Andrew Wendell
(74) *Attorney, Agent, or Firm* — Paradice and Li LLP/Qualcomm

(57) ABSTRACT

Systems and methods are disclosed that may selectively determine network connection information in a wearable wireless device. A wearable wireless device may communicate with a first wireless device associated with a wireless network, estimate a separation distance to the first wireless device, and compare a first network identifier of the wearable wireless device with a second network identifier of the first wireless device. The wearable wireless device may then selectively receive, from the first wireless device, network connection information for the wireless network based, at least in part, on the comparison and the separation distance.

30 Claims, 5 Drawing Sheets

(56) References Cited

U.S. PATENT DOCUMENTS

| | | | |
|---|---|---|---|
| 2016/0037345 A1* | 2/2016 | Margadoudakis | H04L 63/0853 |
| | | | 455/411 |
| 2016/0100303 A1* | 4/2016 | Kim | H04W 76/02 |
| | | | 455/426.1 |
| 2016/0180662 A1* | 6/2016 | Wu | G08B 7/06 |
| | | | 340/8.1 |

* cited by examiner

ENHANCED SYSTEM ACQUISITION FOR WEARABLES

TECHNICAL FIELD

The example embodiments relate generally to wireless communications, and specifically to network connections for wearable wireless devices.

BACKGROUND OF RELATED ART

Wearable wireless devices, such as smartwatches, fitness trackers, smart glasses, and so on, are becoming increasingly popular. Such devices may be capable of communicating using one or more wireless communication protocols. Example wireless communication protocols may include the IEEE 802.11 (e.g., Wi-Fi) protocols, Bluetooth protocols, and Long Term Evolution (LTE). Wi-Fi communications may utilize one or more frequency bands in the 2.4 GHz frequency spectrum (e.g., 2.4G Wi-Fi communications) and/or one or more frequency bands in the 5 GHz frequency spectrum (e.g., 5G Wi-Fi communications). LTE is a set of enhancements to the Universal Mobile Telecommunications System (UMTS) mobile standard promulgated by Third Generation Partnership Project (3GPP). LTE communications may utilize portions of the licensed frequency spectrum (e.g., between approximately 700 MHz-2.6 GHz; also known as LTE-L) and/or portions of the unlicensed frequency spectrum (e.g., around 5 GHz; also known as LTE-U).

Wearable wireless devices are typically coupled to another wireless device, such as a cellular phone. Short-range wireless communication protocols, such as Bluetooth low-energy (BLE), near-field communication (NFC), or Wi-Fi, may be used for communications between a wearable wireless device and another wireless device. Wearable wireless devices (such as smartwatches) tend to have more limited battery capacities than the devices to which they are coupled (such as cellular phones). Accordingly, it may be desirable to reduce the power consumption of wearable wireless devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatus and methods are disclosed that may allow for selective determination of network connection information by wearable wireless devices. In one example, a method for determining network connection information is disclosed. The method may be performed by a wearable wireless device and may include communicating with a first wireless device associated with a wireless network; estimating a separation distance to the first wireless device; comparing a first network identifier of the wearable wireless device with a second network identifier of the first wireless device; and selectively receiving, from the first network device, network connection information for the wireless network based, at least in part, on the comparing and the separation distance.

In another example, a wearable wireless device is disclosed. The wearable wireless device may include one or more transceivers, one or more processors, and a memory storing instructions that, when executed by the one or more processors, cause the wearable wireless device to determine network connection information by performing operations comprising: communicating with a first wireless device associated with a wireless network; estimating a separation distance to the first wireless device; comparing a first network identifier of the wearable wireless device with a second network identifier of the first wireless device; and selectively receiving, from the first network device, network connection information for the wireless network based, at least in part, on the comparing and the separation distance.

In another example, a wearable wireless device for determining network connection information is discloses. The wearable wireless device may include means for communicating with a first wireless device associated with a wireless network; means for estimating a separation distance to the first wireless device; means for comparing a first network identifier of the wearable wireless device with a second network identifier of the first wireless device; and means for selectively receiving, from the first network device, network connection information for the wireless network based, at least in part, on the comparing and the separation distance.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

Figure 1:
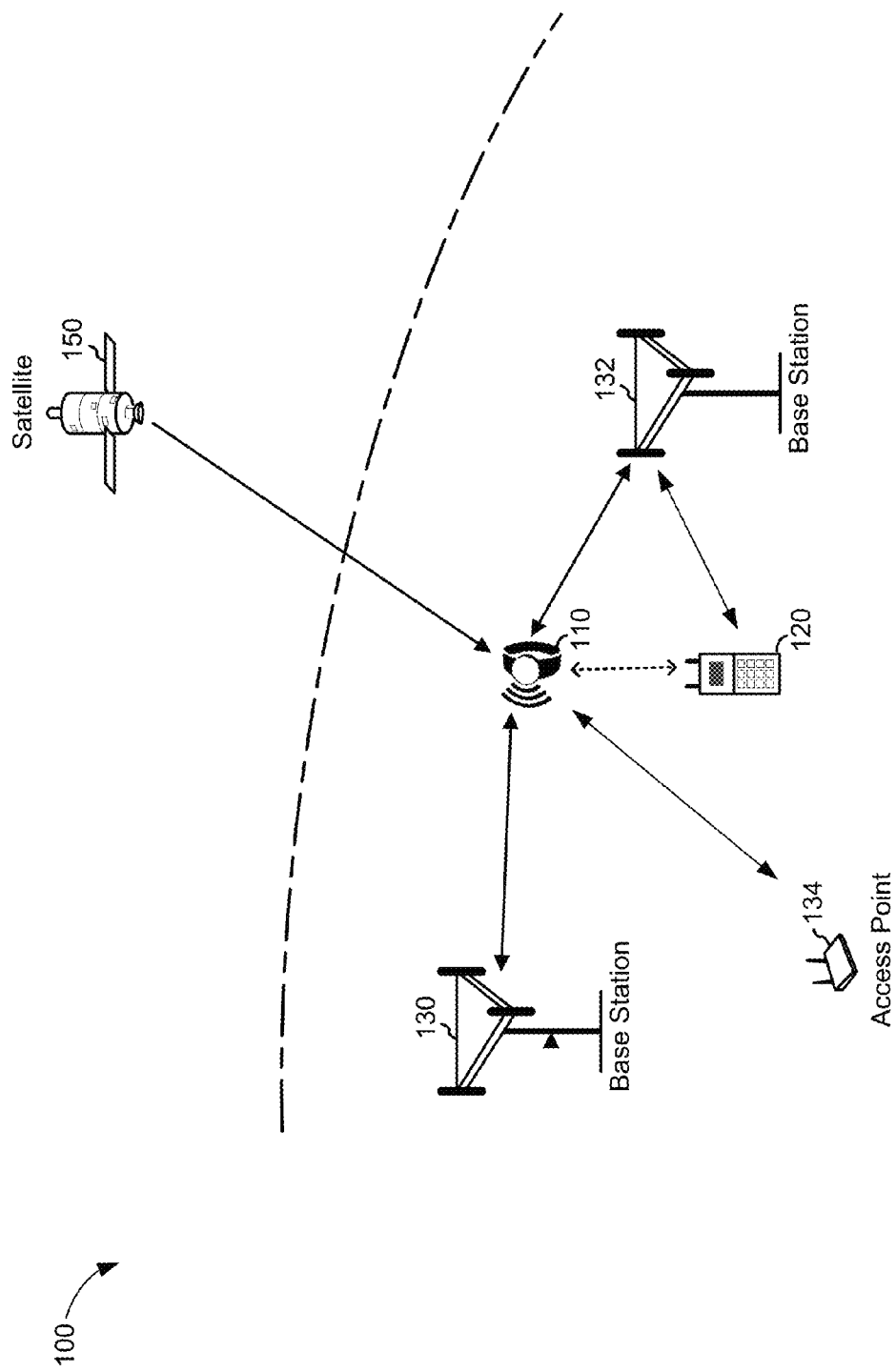
FIG. 1 is a diagram depicting a wireless communication network within which the example embodiments may be implemented.

FIG. 1 is a diagram depicting a wireless communication network 100, within which the example embodiments may be implemented. The wireless communication network 100 includes a wearable wireless device 110, a wireless device 120, wireless base stations 130 and 132, and an access point 134. The base stations 130 and 132 may form at least part of a cellular network, which may operate in accordance with LTE protocols, Code Division Multiple Access (CDMA) protocols, Global System for Mobile Communications (GSM) protocols, and/or other cellular communication protocols. The access point 134 may form at least part of a wireless local area network (WLAN), which may operate in accordance with the IEEE 802.11 family of standards. For simplicity, FIG. 1 shows the wireless communication network 100 including two base stations 130 and 132, and a single access point 134. However, in other embodiments, wireless communication network 100 may include any number of base stations and/or access points.

The wearable wireless device 110 may be a smartwatch, as depicted in FIG. 1, or may alternatively be another wearable wireless device (e.g., fitness tracker, smart glasses, etc.). Wearable wireless device 110 may be coupled to a wireless device 120. In some examples, wearable wireless device 110 may be wirelessly coupled to the wireless device 120 using a Bluetooth Low-Energy (BLE) protocol, a near-field communications (NFC) protocol, a Wi-Fi protocol, or other short-range wireless protocols. The wireless device 120 may also be referred to as user equipment (UE), a mobile station, a terminal, an access terminal, a subscriber unit, a station, etc. For example, the wireless device 120 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc.

For some embodiments, the wireless device 110 may also communicate with the wireless communication network 100. For example, each of the wearable wireless device 110 and the wireless device 120 may transmit signals to, and receive signals from, the base stations 130 and 132 and/or the access point 134. In some aspects, the wireless devices 110 and 120 may further communicate with a satellite 150. For example, the satellite 150 may form at least part of a satellite positioning and/or navigation system (e.g., global positioning system (GPS), global navigation satellite systems (GNSS), etc.). Thus, the wearable wireless device 110 and the wireless device 120 may support a number of radio technologies for wireless communication such as, for example, LTE, WCDMA, CDMA 1×, EVDO, TD-SCDMA, GSM, 802.11, etc.

Figure 2:
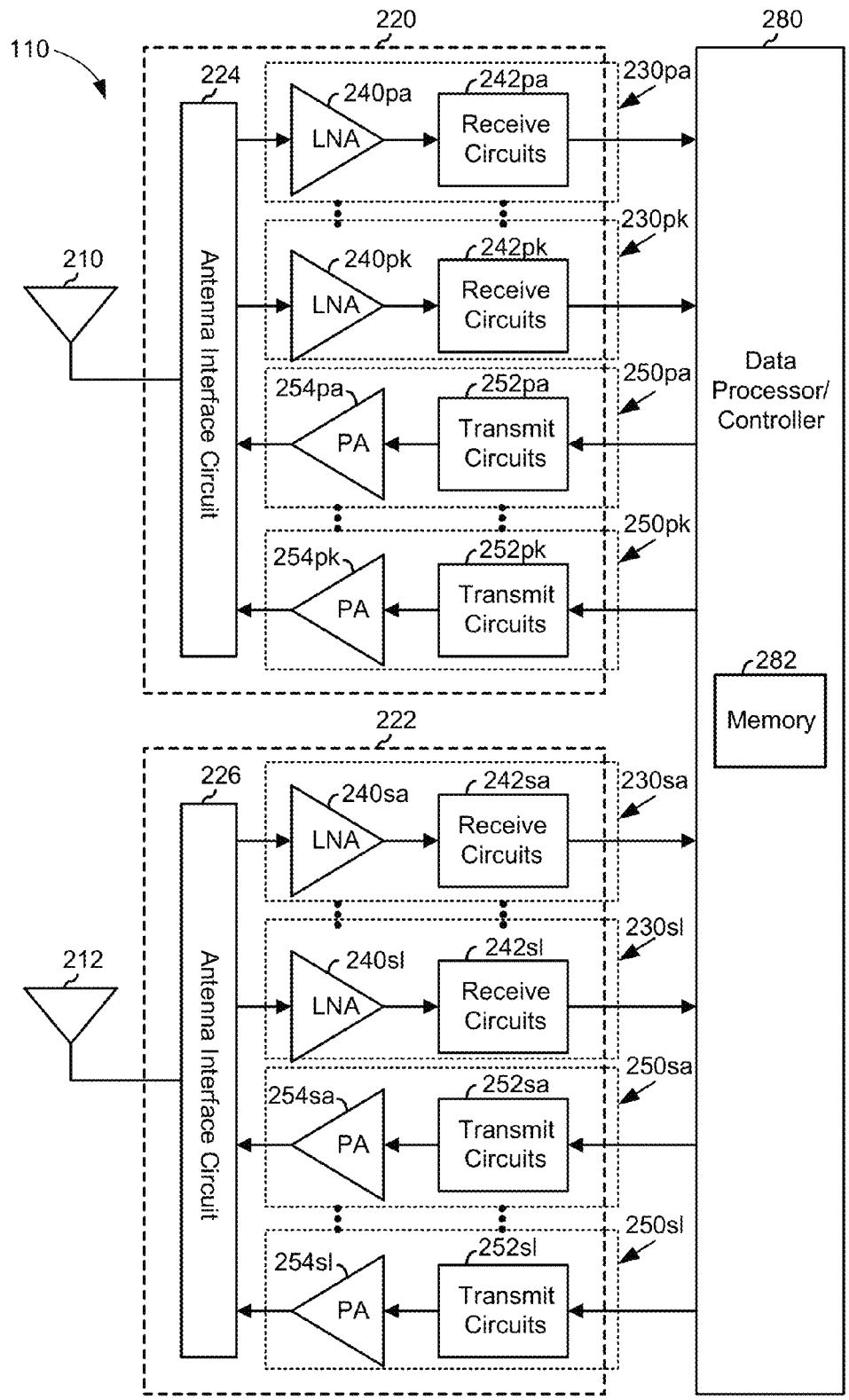
FIG. 2 is a block diagram depicting an example embodiment of the wearable wireless device of FIG. 1.

FIG. 2 is a block diagram depicting an example embodiment of the wearable wireless device 110 of FIG. 1. The wearable wireless device 110 includes a primary transceiver 220 coupled to a primary antenna 210, a secondary transceiver 222 coupled to a secondary antenna 212, and a data processor/controller 280. The primary transceiver 220 may include a number (K) of receivers 230pa-230pk and a number (K) of transmitters 250pa-250pk, and may support multiple frequency bands, multiple radio technologies, carrier aggregation, transmit diversity, and/or multiple-input multiple-output (MIMO) communications. The secondary transceiver 222 may include a number (L) of receivers 230sa-230sl and a number (L) of transmitters 250sa-250sl, and may support multiple frequency bands, multiple radio technologies, carrier aggregation, receive diversity, and/or MIMO communications.

Each of the receivers 230pa-230pk and 230sa-230sl includes a respective low noise amplifier (LNA) 240 (e.g., 240pa-240pk and 240sa and 240sl) and receive circuits 242 (e.g., 242pa-242pk and 242sa and 242sl). The primary antenna 210 may receive radio frequency (RF) signals from base stations and/or other transmitter stations. The antenna interface circuits 224 and 226 may provide the received RF signals to a-selected receivers (e.g., one of the receivers 230pa-230pk or 230sa-230sl). The antenna interface circuits 224 and 226 may include switches, duplexers, transmit filters, receive filters, matching circuits, and other suitable components or circuits for routing received RF signals to one or more of the receivers 230pa-230pk or 230sa-230sl.

In one example, the antenna interface circuit 224 may select the receiver 230pa to receive the RF signals received via antenna 210. Within the receiver 230pa, the LNA 240pa amplifies the RF signal, and receive circuits 242pa may down-convert the amplified RF signal from RF to baseband, amplify and filter the down-converted signal, and provide an analog input signal to data processor/controller 280. The receive circuits 242pa may include mixers, filters, amplifiers, matching circuits, an oscillator, a local oscillator (LO) generator, a phase locked loop (PLL), and other suitable components or circuits. Each of the receivers 230pa-230pk and 230sa-230sl may operate in similar manner as described above with respect to the receiver 230pa.

Each of the transmitters 250pa-250pk and 250sa-250sl includes respective transmit circuits 252 (e.g., 252pa-252pk and 252sa and 252sl) and a power amplifier (PA) 254 (e.g., 254pa-254pk and 254sa and 254sl). The data processor/controller 280 processes (e.g., encodes and modulates) data to be transmitted and provides an analog output signal to a selected transmitter (e.g., one of the transmitters 250pa-250pk or 250sa-250sl). In one example, the data processor/controller 280 may select transmitter 250pa to receive the analog output signal. Within the transmitter 250pa, the transmit circuit 252pa may amplify, filter, and up-convert the analog output signal from baseband to RF and provide a modulated RF signal. The transmit circuit 252pa may include amplifiers, filters, mixers, matching circuits, an oscillator, an LO generator, a PLL, and other suitable components or circuits. The PA 254pa amplifies the modulated RF signal and provides a transmit RF signal at a desired output power level. The transmit RF signal is routed through antenna interface circuit 224 and transmitted via primary antenna 210. Each of the transmitters 250pa-250pk and 250sa-250sl may operate in similar manner as described above with respect to the transmitter 250pa.

Each of the receivers 230pa-230pk and 230sa-230sl and transmitters 250pa-250pk and 250sa-250sl may further include additional circuitry and/or components not shown in FIG. 2, such as filters, matching circuits, and/or other suitable components or circuits. All or a portion of the transceivers 220 and 222 may be implemented on one or more analog integrated circuits (ICs), RF ICs (RFICs), mixed-signal ICs, and other suitable ICs. For example, the LNAs 240 and the receive circuits 242 within the transceivers 220 and 222 may be implemented on multiple IC chips. The circuits in the transceivers 220 and 222 may also be implemented in other manners. Although only two antennas are shown in the example of FIG. 2 (e.g., primary antenna 210 and secondary antenna 212), are shown in FIG. 2 as single antennas, in other embodiments one or more of the transceivers 220 and 222 may be coupled to multiple antennas.

The data processor/controller 280 may perform various functions for the wireless device 110. For example, the data processor/controller 280 may process data received via the receivers 230pa-230pk and 230sa-230sl, and may process data to be transmitted via the transmitters 250pa-250pk and 250sa-250sl. Further, the data processor/controller 280 may control the operations of various circuits within the transceivers 220 and 222. In some embodiments, a memory 282 may store program codes and data for the data processor/controller 280. The data processor/controller 280 may be implemented on one or more application specific integrated circuits (ASICs) and/or other ICs.

As described above, wearable wireless devices typically have limited battery capacities, for example, due to device size and/or form factor constraints. Thus, it may be desirable for wearable wireless devices to conserve power when possible. The example embodiments recognize that connecting to a remote wireless network (e.g., a cellular network) may consume a significant amount of power. For example, when connecting to a remote wireless network, a wearable wireless device may first scan a wireless medium to determine network connection information. Such scanning may include determining information about one or more base stations and selecting a base station to connect to. The connection information may include physical layer information, network identification information (such as a public land mobile network (PLMN) identifier), neighbor measurement information, and other information which may be exchanged via multiple system information blocks (SIBs).

As described above, wearable wireless devices are often wirelessly connected to another mobile wireless device, such as a cellular phone (e.g., using short-range wireless protocols, such as BLE, NFC, etc.). The example embodiments further recognize that the wearable wireless devices are typically in close proximity to the mobile wireless devices with which they are connected. For example, a smartwatch may be worn on a user's wrist while connected to a cellular phone (e.g., via BLE) which is in the user's pocket. Thus, the cellular phone and smartwatch may communicate with the same wireless (e.g., cellular, Wi-Fi, etc.) network using the same or similar network connection information In example embodiments, the wearable wireless device 110 may selectively receive network connection information from a wirelessly connected mobile device (not shown for simplicity). For example, the wearable wireless device 110 may be wirelessly connected to another wireless device using a first communication protocol. In some aspects, the wearable wireless device 110 may communicate directly with a wireless network to determine the network connection information for the wireless network. In other aspects, the wearable wireless device 110 may receive the network connection information from the other wireless device. The example embodiments recognize that the wearable wireless device 110 and the other wireless device may use the same network connection information to connect to the wireless network when devices are within a threshold proximity of one another and share the same wireless network identifier (e.g., the two devices share the same PLMN or wireless carrier in a cellular network).

For some embodiments, the wearable wireless device 110 may operate in a first mode when the device 110 is not within the threshold proximity of the other wireless device or does not share the same wireless network identifier as the other wireless device. While operating in the first mode, the wearable wireless device may be configured to communicate directly with the wireless network to determine the network connection information. Further, for some embodiments, the wearable wireless device 110 may operate in a second mode when the device 110 is within the threshold proximity of the other wireless device and shares the same wireless network identifier as the other wireless device. While operating in the second mode, the wearable wireless device 110 may be configured to receive the network connection information from the other wireless device, thereby conserving power.

While operating in the second mode, the wearable wireless device 110 may send a request to the other wireless device and receive the network connection information from the other wireless device in response to the request. In some embodiments, the wearable wireless device 110 may also be capable of operating in a low-power state. For example, upon exiting the low-power state, the wearable wireless device 110 may determine whether to operate in the first mode or the second mode.

Figure 3:
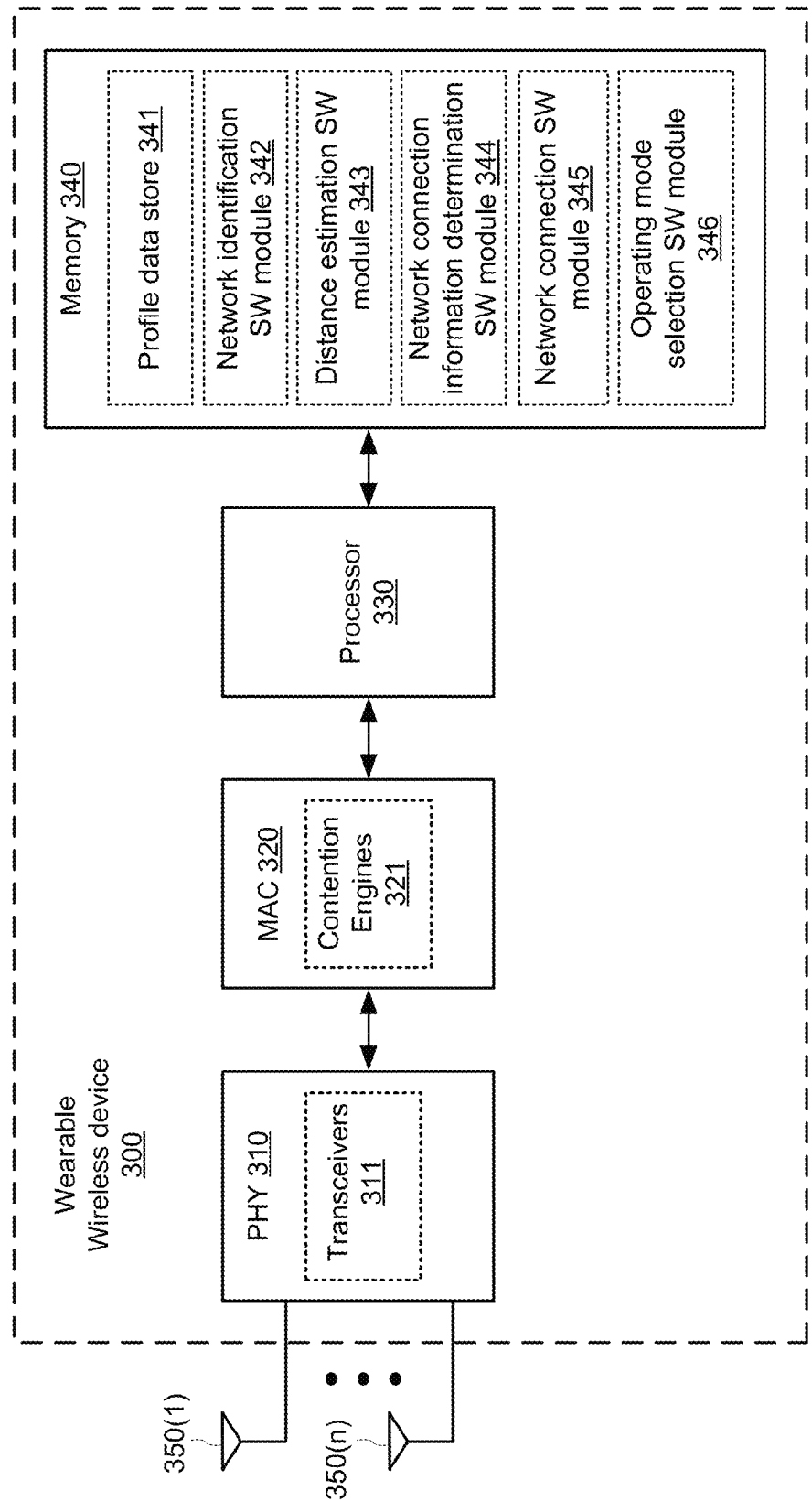
FIG. 3 is a block diagram of wireless device in accordance with example embodiments.

FIG. 3 shows a wearable wireless device 300 that may be one embodiment of wearable wireless device 110 of FIG. 1. The wearable wireless device 300 may include a PHY device 310 including at least a number of transceivers 311, may include a MAC 320 including at least a number of contention engines 321, may include a processor 330, may include a memory 340, and may include a number of antennas 350(1)-350(n). The transceivers 311 may be coupled to antennas 350(1)-350(n) either directly or through an antenna selection circuit (not shown in FIG. 3 for simplicity). The transceivers 311 may be used to transmit signals to and receive signals from other wireless devices. Although not shown in FIG. 3 for simplicity, each of the transceivers 311 may include any number of transmit chains to process and transmit signals to other wireless devices via antennas 350(1)-350(n), and may include any number of receive chains to process signals received from antennas 350(1)-350(n). Thus, for example embodiments, the wearable wireless device 300 may be configured for MIMO operations.

For purposes of discussion herein, MAC 320 is shown in FIG. 3 as being coupled between PHY device 310 and processor 330. For actual embodiments, PHY device 310, MAC 320, processor 330, and/or memory 340 may be connected together using one or more buses (not shown for simplicity).

The contention engines 321 may contend for access to one more shared wireless mediums, and may also store packets for transmission over the one more shared wireless mediums. The wearable wireless device 300 may include one or more contention engines 321 for each of a plurality of different access categories. For other embodiments, the contention engines 321 may be separate from MAC 320. For still other embodiments, the contention engines 321 may be implemented as one or more software modules (e.g., stored in memory 340 or stored in memory provided within MAC 320) containing instructions that, when executed by processor 330, perform the functions of contention engines 321.

Memory 340 may include a profile data store 341 that stores profile information for a plurality of wireless devices. The profile information for a particular wireless device may include information such as, for example, an SSID, a MAC address, channel information, RSSI values, goodput values, channel state information (CSI), supported data rates, connection history, a trustworthiness scale (e.g., indicating a level of confidence about the wireless device's location, etc.), and any other suitable information pertaining to or describing the operation of the wireless device.

Figure 5:
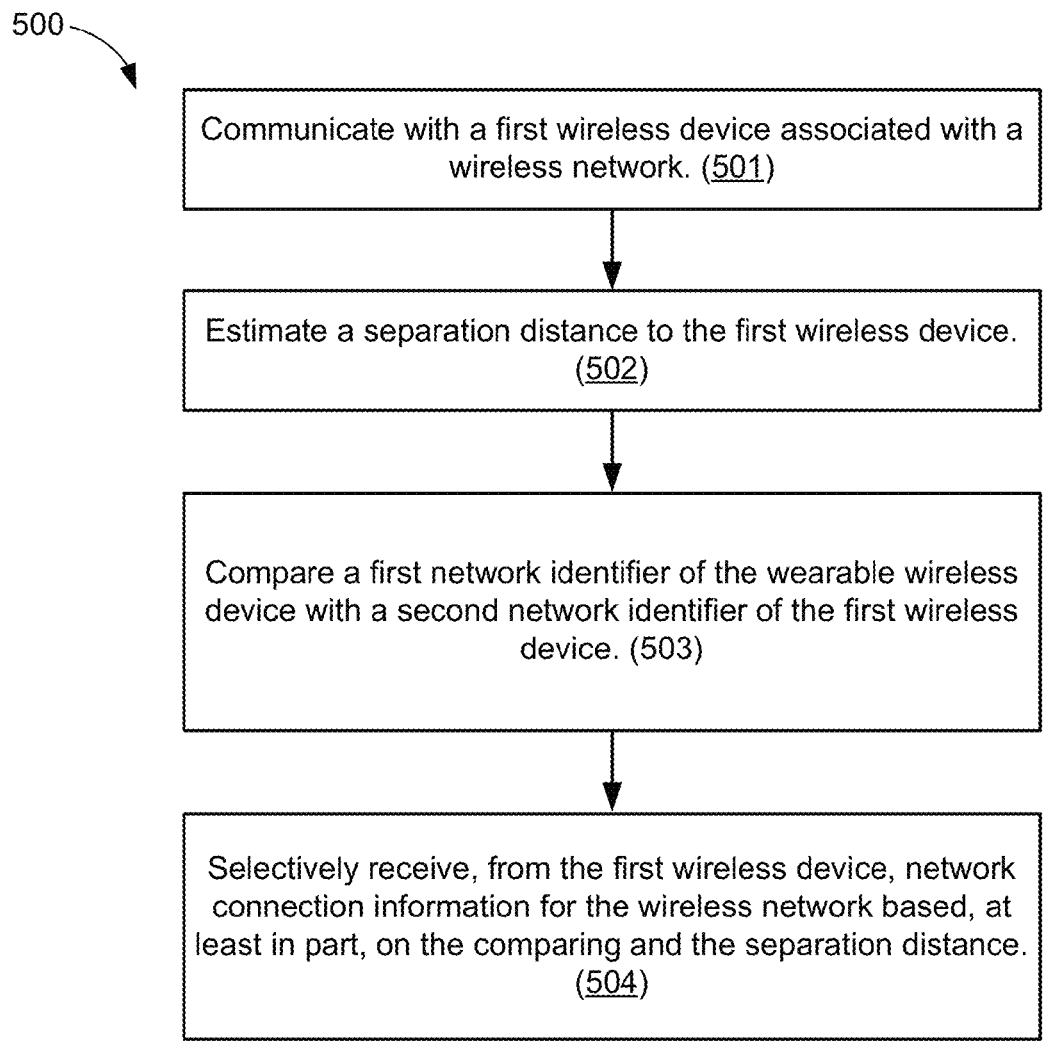
FIG. 5 is an illustrative flow chart depicting example operations for selectively determining network connection information, in accordance with example embodiments.

Memory 340 may also include a non-transitory computer-readable medium (e.g., one or more nonvolatile memory elements, such as EPROM, EEPROM, Flash memory, a hard drive, and so on) that may store at least the following software (SW) modules:

- a network identification software module 342 to determine network identifiers for remote wireless devices, and to compare such network identifiers to one or more network identifiers of wearable wireless device 300 (e.g., as described below with respect to FIG. 5);
- a distance estimation software module 343 to estimate separation distances—for example using received signal strength indication (RSSI) or round-trip time (RTT)—between wearable wireless device 300 and one or more remote wireless devices (e.g., as described below with respect to FIG. 5);
- a network connection information determination software module 344 to independently determine network connection information when the wearable wireless device 300 operates in a first mode, and to receive network connection information from another wireless device when the wearable wireless device 300 operates in a second mode (e.g., as described below with respect to FIG. 5);
- a network connection software module 345 to establish a connection with a wireless network using the network connection information (e.g., as described for below with respect to FIG. 5); and
- an operating mode selection software module 346 to select one of the first mode or the second mode based at least in part on the separation distances and the network identifiers of one or more remote wireless devices (e.g., as described below with respect to FIG. 5).

Each software module includes instructions that, when executed by processor 330, cause wireless device 300 to perform the corresponding functions. The non-transitory computer-readable medium of memory 340 thus includes instructions for performing all or a portion of the operations depicted in FIG. 5.

Processor 330, which is shown in the example of FIG. 3 as coupled to PHY device 310, to MAC 320, and to memory 340, may be any suitable one or more processors capable of executing scripts or instructions of one or more software programs stored in wearable wireless device 300 (e.g., within memory 340). For example, processor 330 may execute the network identification software module 342 to determine network identifiers for remote wireless devices, and to compare such network identifiers to one or more network identifiers of wearable wireless device 300. Processor 330 may also execute distance estimation software module 343 to estimate separation distances—for example using received signal strength indication (RSSI) or round-trip time (RTT)—between wearable wireless device 300 and one or more remote wireless devices. Processor 330 may also execute the network connection information determination software module 344 to independently determine network connection information when the wearable wireless device 300 operates in a first mode, and to receive network connection information from another wireless device when the wearable wireless device 300 operates in a second mode. Processor 330 may also execute the network connection software module 345 to establish a connection with a wireless network using the network connection information. Processor 330 may also execute the operating mode selection software module 346 to select one of the first mode or the second mode based at least in part on the separation distances and the network identifiers of one or more remote wireless devices.

As discussed above, the wearable wireless device 300 may be wirelessly coupled to another wireless device, such as a cellular phone (e.g., via Wi-Fi or a short-range wireless protocol such as BLE or NFC). Because the wearable wireless device 300 may be in close proximity to the other wireless device, the two devices may share the same network connection information. For cellular networks, such network connection information may include one or more system information blocks (SIBs), one or more neighbor measurements, information relating to cell selection and reselection, and so on.

The example embodiments may allow the wearable wireless device 300 to conserve power by leveraging the connection information of the other wireless device (e.g., rather than independently determining its own network connection information). However, the accuracy and/or applicability of the network connection information received from the other wireless device may depend on the separation distance between the wearable wireless device 300 and the other wireless device. For example, the share network connection information may be most accurate and reliable when the wearable wireless device 300 and the other wireless device are (i) co-located—that is, within a predetermined separation distance from the other—and (ii) associated with the same wireless network—for example, the two devices both being associated with the same cellular carrier.

For some embodiments, the wearable wireless device 300 may operate in a first mode (e.g., where the wearable wireless device 300 independently determines its own network connection information by communicating directly with the wireless network) or a second mode (e.g., where the wearable wireless device 300 receives the network connection information from the other wireless device). For example, the wearable wireless device 300 may operate in the second mode when the separation distance between the wearable wireless device 300 and the other wireless device is less than a threshold, and the two wireless devices are associated with the same wireless network. Otherwise, the wearable wireless device 300 may operate in the first mode (e.g., when the separation distance is greater than the threshold and/or the two devices are associated with different wireless networks).

In some aspects, the wearable wireless device 300 may estimate the separation distance using suitable ranging techniques, such as ranging techniques based on received signal strength indicators (RSSI) or round-trip time (RTT). In other aspects, the wearable wireless device 300 may determine whether the other wireless device is associated with the same wireless network by determining whether a network identifier of the wearable wireless device 300 matches a network identifier of the other wireless device. In some embodiments, the network identifier may be a public land mobile network (PLMN) identifier.

Figure 4B:
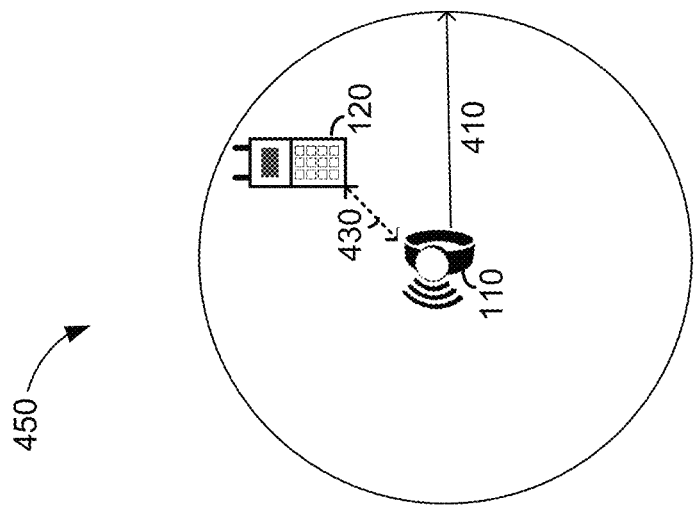
FIG. 4B is a diagram depicting an example spatial configuration of a wearable wireless device and another wireless device, according to some embodiments.
Figure 4A:
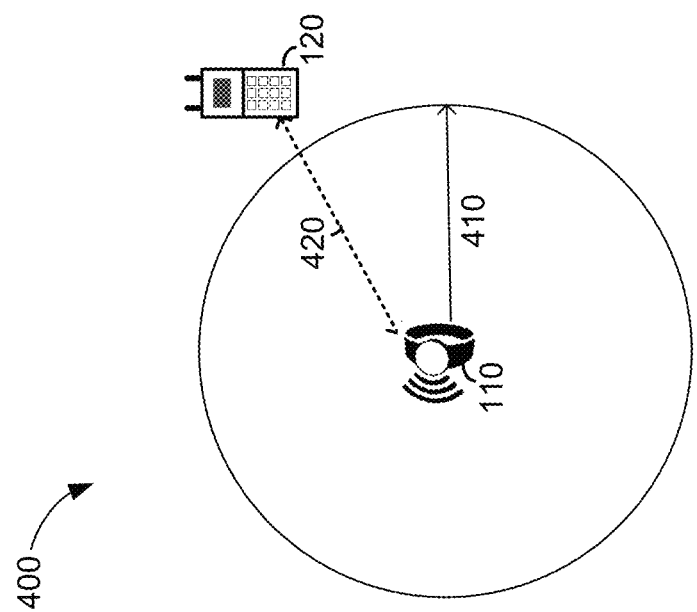
FIG. 4A is a diagram depicting an example spatial configuration of a wearable wireless device and another wireless device, according to some embodiments.

FIG. 4A shows an example spatial configuration 400 of a wearable wireless device and another wireless device, according to some example embodiments. With respect to FIG. 4A, the wearable wireless device 110 is wirelessly coupled to the other wireless device 120. Although the wearable wireless device 110 is depicted as a smartwatch in FIG. 4A, in other examples the wearable wireless device 110 may be a fitness tracker, smart glasses, or any other wearable wireless device. In the example of FIG. 4A, wearable wireless device 110 and wireless device 120 are separated by a separation distance 420. For some embodiments, wearable wireless device 110 may operate in the first mode when the separation distance is greater than a threshold separation distance 410. In some examples, the threshold separation distance 410 may be 10 meters.

As seen in FIG. 4A, separation distance 420 is greater than the threshold separation distance 410. Upon determining that the separation distance 420 exceeds the threshold separation distance 410 (e.g. using well-known ranging techniques), the wearable wireless device 110 may operate in the first mode, and may independently determine its network connection information by communicating directly with a wireless network (not shown for simplicity). In some examples, wearable wireless device 110 may operate in the first mode, upon determining that the separation distance 420 exceeds the threshold separation distance 420, regardless of whether its wireless network identifier matches a wireless network identifier of wireless device 120.

FIG. 4B shows an example spatial configuration 450 of the wearable wireless device 110 and the other wireless device 120, according to other example embodiments. In the example of FIG. 4B, wearable wireless device 110 and wireless device 120 are located at a separation distance 430, which is less than the threshold separation distance 410. Upon determining that the separation distance 430 is within the threshold separation distance 410 (e.g., using well-known ranging techniques), the wearable wireless device 110 may determine whether its wireless network identifier matches the wireless identifier of wireless device 120. For example, wearable wireless device 110 may determine whether its PLMN matches the PLMN of wireless device 120. If the wireless network identifiers match, then wearable wireless device 110 may operate in the second mode, and may receive the network connection information from wireless device 120. If the wireless network identifiers do not match, then wearable wireless device 110 may operate in the first mode (e.g., as described above with respect to FIG. 4A).

FIG. 5 is an illustrative flow chart depicting an example operation 500 for selectively determining network connection information, in accordance with some embodiments. The example operation 500 may be performed by any suitable wearable wireless device, such as wearable wireless device 110 of FIGS. 1, 2, 4A and 4B, or wearable wireless device 300 of FIG. 3, which may be a smartwatch, a fitness tracker, smart glasses, or another wearable wireless device. In some embodiments, a wearable wireless device may be capable of operating in a low-power state, and the operation 500 may be performed in response to the device exiting the low-power state.

A wearable wireless device may communicate with a first wireless device which is associated with a wireless network (501). For example, the first wireless device may be a cellular phone. In some embodiments, the wearable wireless device may communicate with the first wireless device using a Wi-Fi protocol or a short-range wireless protocol such as NFC or BLE. The wireless network may be a cellular network operating according to a cellular protocol. The wearable wireless device may communicate with the first wireless device by executing network connection software module 345 of FIG. 3.

The wearable wireless device may estimate a separation distance between the wearable wireless device and the first wireless device (502). For example, the separation distance may be estimated by executing the distance estimation software module 343 of wearable wireless device 300 of FIG. 3. In some embodiments the separation distance may be estimated using well-known ranging techniques based on RSSI or RTT measurements.

The wearable wireless device may then compare a first network identifier of the wearable wireless device with a second network identifier of the first wireless device (503). For example, the first and the second network identifiers may each be a PLMN identifier associated with a cellular network. In some embodiments, the first network identifier may be compared to the second network identifier by executing network identification software module 342 of wearable wireless device 300 of FIG. 3.

The wearable wireless device may then selectively receive, from the first wireless device, network connection information for the wireless network based, at least in part, on the comparing and the separation distance (504). For example, the network connection information may include one or more system information blocks (SIBs) or one or more neighbor measurements. In some embodiments, the wearable wireless device may communicate with the wireless network to determine the network connection information if the separation distance is greater than or equal to a threshold distance or if the first network identifier does not match the second network identifier. If the separation distance is less than the threshold distance, and the first network identifier does match the second network identifier, the wearable wireless device may receive the network connection information from the first wireless device. In some examples, receiving the network connection information from the first wireless device may include transmitting a request to the first wireless device, and receiving the network connection information in response to the request. For example, the selectively receiving the network connection information may be performed by executing operating mode selection software module 346 of wearable wireless device 300 of FIG. 3.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for determining network connection information, the method performed by a wearable wireless device and comprising:
communicating with a first wireless device associated with a wireless network;
estimating a separation distance between the wearable wireless device and the first wireless device;
comparing a first network identifier of the wearable wireless device with a second network identifier of the first wireless device to determine whether or not the wearable wireless device and the first wireless device are both associated with the wireless network; and
selectively receiving, from the first wireless device, network connection information for the wireless network based at least in part on the comparing and the separation distance.

2. The method of claim 1, wherein the wearable wireless device communicates with the first wireless device using a short-range wireless protocol, and wherein the first wireless device communicates with the wireless network using a cellular communication protocol.

3. The method of claim 2, wherein the short-range wireless protocol is a Bluetooth Low Energy (BLE) protocol or a near-field communications (NFC) protocol.

4. The method of claim 1, wherein the network connection information includes one or more system information blocks (SIBs) or one or more neighbor measurements.

5. The method of claim 1, further comprising connecting to the wireless network using the network connection information.

6. The method of claim 1, wherein the first network identifier and the second network identifier identifies a public land mobile network (PLMN).

7. The method of claim 1, wherein the selectively receiving comprises:
communicating with the wireless network to determine the network connection information if the separation distance is greater than or equal to a threshold distance or if the first network identifier does not match the second network identifier.

8. The method of claim 1, wherein the selectively receiving comprises:
receiving the network connection information from the first wireless device if the separation distance is less than a threshold distance and the first network identifier matches the second network identifier.

9. The method of claim 8, wherein receiving the network connection information from the first wireless device comprises:
transmitting a request to the first wireless device; and
receiving the network connection information in response to the request.

10. The method of claim 1, wherein the separation distance is estimated based at least in part on a received signal strength indication (RSSI) or a round trip time (RTT) of communications with the first wireless device.

11. A wearable wireless device, comprising:
one or more transceivers;
one or more processors; and
a memory storing one or more programs comprising instructions that, when executed by the one or more processors, cause the wearable wireless device to determine network connection information by performing operations comprising:
communicating with a first wireless device associated with a wireless network;
estimating a separation distance between the wearable wireless device and the first wireless device;
comparing a first network identifier of the wearable wireless device with a second network identifier of the first wireless device to determine whether or not the wearable wireless device and the first wireless device are both associated with the wireless network; and
selectively receiving, from the first wireless device, network connection information for the wireless network based at least in part on the comparing and the separation distance.

12. The wearable wireless device of claim 11, wherein the wearable wireless device communicates with the first wireless device using a short-range wireless protocol, and wherein the first wireless device communicates with the wireless network using a cellular communication protocol.

13. The wearable wireless device of claim 12, wherein the short-range wireless protocol is a Bluetooth Low Energy (BLE) protocol or a near-field communications (NFC) protocol.

14. The wearable wireless device of claim 11, wherein the network connection information includes one or more system information blocks (SIBs) or one or more neighbor measurements.

15. The wearable wireless device of claim 11, wherein the instructions execute to cause the wearable wireless device to perform operations further comprising connecting to the wireless network using the network connection information.

16. The wearable wireless device of claim 11, wherein the first network identifier and the second network identifier identifies a public land mobile network (PLMN).

17. The wearable wireless device of claim 11, wherein the instructions which execute to selectively receive the network connection information cause the wearable wireless device to perform operations further comprising:
communicating with the wireless network to determine the network connection information if the separation distance is greater than or equal to a threshold distance or if the first network identifier does not match the second network identifier.

18. The wearable wireless device of claim 11, wherein the instructions which execute to selectively receive the network connection information cause the wearable wireless device to perform operations further comprising:
receiving the network connection information from the first wireless device if the separation distance is less than a threshold distance and the first network identifier matches the second network identifier.

19. The wearable wireless device of claim 18, wherein the instructions which execute to cause the wearable wireless device to receive the network connection information from the first wireless device cause the wearable wireless device to perform operations further comprising:
- transmitting a request to the first wireless device; and
- receiving the network connection information in response to the request.

20. The wearable wireless device of claim 11, wherein the separation distance is estimated based at least in part on a received signal strength indication (RSSI) or a round trip time (RTT) of communications with the first wireless device.

21. A non-transitory computer-readable storage medium storing one or more programs containing instructions that, when executed by one or more processors of a wearable wireless device, cause the wearable wireless device to selectively operate in a first mode or a second mode by performing operations comprising:
- communicating with a first wireless device associated with a wireless network;
- estimating a separation distance between the wearable wireless device and the first wireless device;
- comparing a first network identifier of the wearable wireless device with a second network identifier of the first wireless device to determine whether or not the wearable wireless device and the first wireless device are both associated with the wireless network; and
- selectively receiving, from the first wireless device, network connection information for the wireless network based at least in part on the comparing and the separation distance.

22. The non-transitory computer-readable storage medium of claim 21, wherein the wearable wireless device communicates with the first wireless device using a short-range wireless protocol, and wherein the first wireless device communicates with the wireless network using a cellular communication protocol.

23. The non-transitory computer-readable storage medium of claim 22, wherein the short-range wireless protocol is a Bluetooth Low Energy (BLE) protocol or a near-field communications (NFC) protocol.

24. The non-transitory computer-readable storage medium of claim 21, wherein the network connection information includes one or more system information blocks (SIBs) or one or more neighbor measurements.

25. The non-transitory computer-readable storage medium of claim 21, further comprising:
- connecting to a wireless network using the network connection information.

26. The non-transitory computer-readable storage medium of claim 21, wherein the first network identifier and the second network identifier identifies a public land mobile network (PLMN).

27. The non-transitory computer-readable storage medium of claim 21, wherein execution of the instructions to cause the wearable wireless device to selectively receive the network connection information cause the wearable wireless device to perform operations further comprising:
- communicating with the wireless network to determine the network connection information if the separation distance is greater than or equal to a threshold distance or if the first network identifier does not match the second network identifier.

28. The non-transitory computer-readable storage medium of claim 21, wherein execution of the instructions to selectively receive the network connection information causes the wearable wireless device to perform operations further comprising:
- receiving the network connection information from the first wireless device if the separation distance is less than a threshold distance and the first network identifier matches the second network identifier.

29. The non-transitory computer-readable storage medium of claim 28, wherein execution of the instructions to selectively receive the network connection information causes the wearable wireless device to perform operations further comprising:
- transmitting a request to the first wireless device; and
- receiving the network connection information in response to the request.

30. A wearable wireless device for determining network connection information, the wearable wireless device comprising:
- means for communicating with a first wireless device associated with a wireless network;
- means for estimating a separation distance between the wearable wireless device and the first wireless device;
- means for comparing a first network identifier of the wearable wireless device with a second network identifier of the first wireless device to determine whether or not the wearable wireless device and the first wireless device are both associated with the wireless network; and
- means for selectively receiving, from the first wireless device, network connection information for the wireless network based at least in part on the comparing and the separation distance.

* * * * *